(12) United States Patent
Leglise et al.

(10) Patent No.: US 7,729,943 B1
(45) Date of Patent: Jun. 1, 2010

(54) REMOTELY MANAGING AND CONTROLLING A CONSUMER APPLIANCE

(76) Inventors: Claude M. Leglise, 2200 Mission College Blvd., Santa Clara, CA (US) 95052; Thomas C. Miller, 3610 E. Dakota, Phoenix, AZ (US) 85044

( * ) Notice: Subject to any disclaimer, the term of this patent is extended or adjusted under 35 U.S.C. 154(b) by 1251 days.

(21) Appl. No.: 09/584,520

(22) Filed: May 31, 2000

(51) Int. Cl.
    G06Q 30/00 (2006.01)
    G06F 3/00 (2006.01)
(52) U.S. Cl. .................. 705/14.73; 715/700; 715/717; 715/744
(58) Field of Classification Search ............ 705/14
    See application file for complete search history.

(56) References Cited

U.S. PATENT DOCUMENTS

| | | | |
|---|---|---|---|
| 5,774,652 A * | 6/1998 | Smith | 713/200 |
| 5,778,187 A * | 7/1998 | Monteiro et al. | 709/231 |
| 5,802,518 A * | 9/1998 | Karaev et al. | 707/9 |
| 5,855,008 A * | 12/1998 | Goldhaber et al. | 705/14 |
| 5,907,617 A * | 5/1999 | Ronning | 705/52 |
| 6,009,469 A * | 12/1999 | Mattaway et al. | 709/227 |
| 6,205,476 B1 | 3/2001 | Hayes, Jr. | |
| 6,237,022 B1 * | 5/2001 | Bruck et al. | 709/201 |
| 6,298,348 B1 * | 10/2001 | Eldering | 707/10 |
| 6,308,175 B1 * | 10/2001 | Lang et al. | 707/10 |
| 6,412,073 B1 * | 6/2002 | Rangan | 726/5 |

FOREIGN PATENT DOCUMENTS

| | | |
|---|---|---|
| JP | 2000-13524 | 1/2000 |
| KR | 1999-0078766 | 11/1999 |
| KR | 1999-0087923 | 12/1999 |
| KR | 2000-0024523 | 5/2000 |

OTHER PUBLICATIONS

Local Internet Co. Working to Change Face of On-line Banking; The Business Journal—Central New York; Syracuse; Dec. 17, 1999; Mark Hadley.*
Meet the "virtual ISP", Telephony, Aug. 10, 1998, Vince Vittore.*
Internet America, Inc. Announces Pact With Netsurfer; Netsurfer Software Will Make Signing up Fast and Easy; PR Newswire; New York; Jun. 8, 1999.*
Netsurfer, Inc. Becomes Approved Vendor to the Internet Service Provider's Consortium; Janice Lewis. Jun. 8, 1998.*

(Continued)

Primary Examiner—Yehdega Retta
(74) Attorney, Agent, or Firm—Trop, Pruner & Hu, P.C.

(57) ABSTRACT

A processor-based system utilized by a consumer may be controlled and managed by a service provider for the benefit of a retail vendor. The service provider may control the content that is displayed on the client system. For example, the service provider may control the initial sets of graphical user interfaces that are provided to enable the consumer to make service selections. In addition, the consumer may be asked for information that enables the system to customize subsequent information provided to the consumer. As a result, the consumer's processor-based system may be remotely managed and controlled to facilitate communications between a particular retail vendor and a consumer.

15 Claims, 10 Drawing Sheets

OTHER PUBLICATIONS

Ziplink's Virtual Internet Service Provider (ISP) Program Provides Complete Turnkeys Outsourcing Option; PR Newswire; New York; Nov. 4, 1999.*

Netsurfer makes it easy; Get subscribers, get tem online; and start making more money; Dodd Judd Erickson; Jan. 2000, www.boardwarch.com.*

Branded Internet Access: Traditional Business Gets a New Lock on Customers Through iDigi Networks; PR Newswire; New York; Aug. 20 1999.*

Ubrandit.com to expand its Internet offerings to include a fully branded virtual ISP Portal Service to companies and affinity Groups; Business Wire; New York; Mar. 7, 2000; Business Editors.*

Brand3 touts branded Net access, Adweek; New York; Mar. 6, 2000; Janis Mara.*

Ikano expands DSL availability through a strategic partnership with New Edge Networks; PR Newswire; Mar. 13, 2000.*

A service in kind; Tele.Com; Manhasset; May 3, 1999; Anne Zieger.*

Internet Entrepreneur eyes a new web service his company, I2EYENET.COM launches its "background" operation today; The Post—Standard; Syracuse; Aug. 6, 1999; Tim Knauss Staff writer.*

Informatica and Net Perceptions form strategic partnership to provide E-Commerce companies with powerful e-CRM Solution; PR Newswire; New York; Mar. 16, 2000.*

Beyond bots; Collaborative filtering firms enter more E-Commerce venues despite privacy concerns.; Report on Electronic Commerce; Washington; Sep. 8, 1998; Gary H Arlen.*

Intel wants to be the ISP's ISP; ZDNet.co.uk; Apr. 23, 1999; http://www.zdnet.co.uk/misc/print.*

Intel launches ISP programs; Computerworld; staff writer; Nov. 8, 1999; http://www.computerworld.com.au/index.php/id.*

BISYS® Enables Financial Institutions to Bring Direct Internet Access Services to Their Customers; Jan. 10, 2000.*

Virtual ISP, ZipLink website, *at* http://www.ziplink.com/visp (last visited Apr. 24, 2007).

Virtual ISP—How It Works, ZipLink website, *at* http://www.ziplink.com/visp/howitworks.shtml (last visited Apr. 24, 2007).

ZipLink, *virtual ISP now everyone connects*, www.ziplink.com/visp, Mar. 3, 2000, 7 pgs.

* cited by examiner

REMOTELY MANAGING AND CONTROLLING A CONSUMER APPLIANCE

BACKGROUND

This invention relates generally to consumer appliances in the form of processor-based systems.

Consumers may prefer an appliance-like functionality when using conventional processor-based systems such as computer systems. For example, conventional processor-based systems such as desktop computer systems initially undergo a boot up process. In contrast, appliances are immediately available and immediately responsive. Thus, there is a demand for processor-based systems, particularly for home users, that implement a wide variety of computer functions in an appliance-like fashion. For example, telephone, Internet and e-mail access may all be implemented in an appliance-like processor-based system.

The increasing prevalence of processor-based systems in the home opens the opportunity for targeted home-based marketing. That is, vendors may attempt to directly contact consumers in their homes with targeted advertisements. For example, some entities now steer particular information to consumers based on databases containing information about those consumers. These databases contain information about what types of products the consumer is interested in based on the consumer's on-line activities. In this way, based on the consumer's indicated interest, advertising may be targeted to receptive consumers.

However, there is a continuing need for better ways to utilize home processor-based systems to increase marketing effectiveness.

DETAILED DESCRIPTION

Through interaction between a service provider and a retail vendor, a processor-based system at a customer's home or other location may be advantageously operated to facilitate the interests of the customer and the retail vendor. The customer may be asked to provide information to the service provider, who is independent from the retail vendor, to customize the options afforded to the customer on the customer's processor-based system. The service provider provides Internet services to the customer on behalf of the retail vendor. In return for those services, the customer is requested to first receive content related to the products or services of the retail vendor before accessing the Internet services from the service provider.

Thus, the service provider may provide a series of graphical user interfaces which include content related to the retail vendor such as advertisements and in addition obtains information from the customer to further customize the options made available to the customer. By simplifying each graphical user interface to a limited number of selections, the ease of use of the interface may be greatly facilitated.

In this way, the retail vendor is afforded a preferred link to an individual customer. The customer receives simple-to-use Internet services and access to customized information related to the retail vendor. In some cases, the service provider may be able to provide the customer with a processor-based system at a reduced cost.

Figure 1:
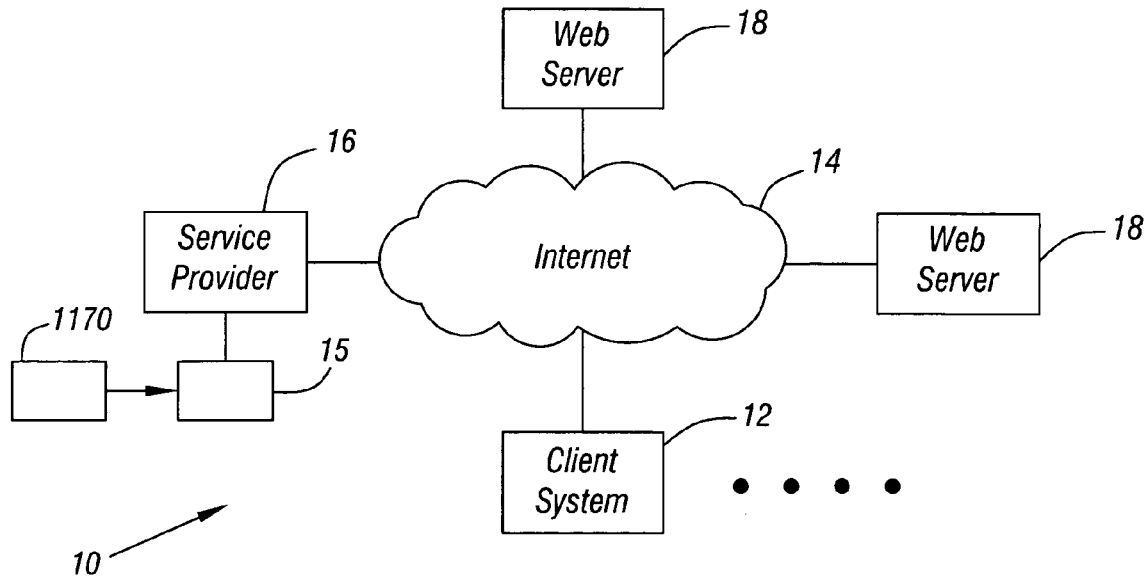
FIG. 1 is a schematic depiction of one embodiment of the present invention.

Referring to FIG. 1, a system 10 for remotely managing and controlling a plurality of consumer appliances, such as the client system 12, includes a service provider 16 and one or more web servers 18 coupled over the Internet 14. A consumer may use the home-based client system 12. The service provider 16 in the form of a server processor-based system may control the system 10 in accordance with one embodiment of the present invention. Each web server 18 may be associated with a different retail vendor. As used herein, a retail vendor is an entity that provides products or services to consumers. Each retail vendor may arrange for a service provider 16 to provide remote management and control of a number of client systems 12 in accordance with one embodiment of the present invention.

Figure 1A:
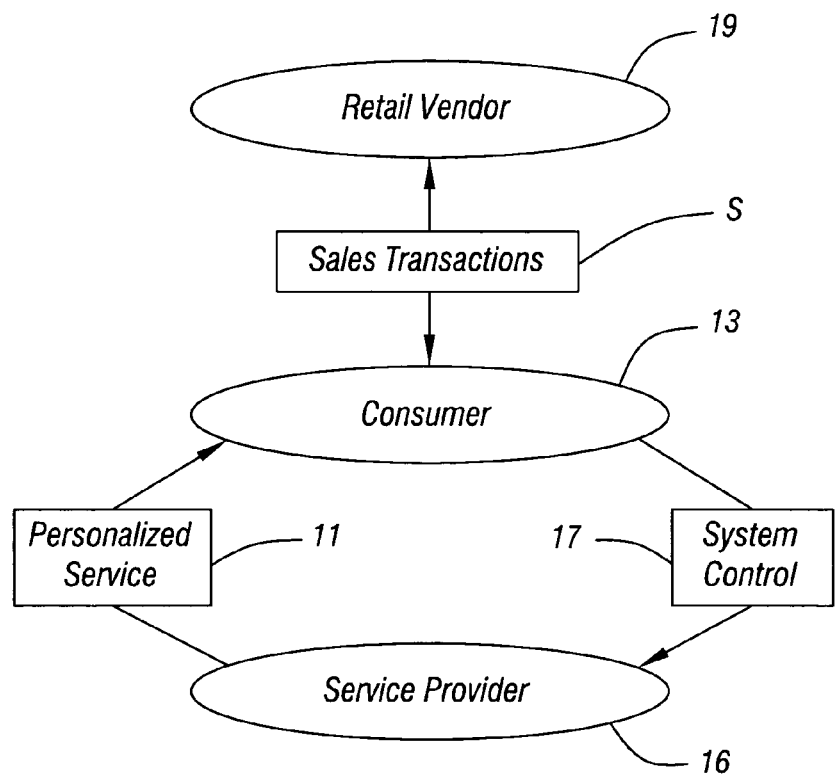
FIG. 1A is a conceptual depiction of one embodiment of the present invention.

Referring to FIG. 1A, the service provider 16 may provide a large number of consumers 13 with personalized service 11 through a client system 12. This personalized service 11 may be provided by obtaining information from the consumer 13 about the consumer's preferences. Based on that information, the service provider 16 can provide information to the consumer 13 that is modified, or tailored to reflect that consumer's preferences.

At the same time, the consumer 13 may allow the service provider 16 to control the consumer's client system 12. This control may include providing user interfaces that provide targeted information about a particular retail vendor. Moreover, the control may limit the options that the consumer must consider. Therefore, a relatively close association may be achieved between a retail vendor 19 and a consumer 13 as a result of the services provided by the service provider 16. Ideally, the service provider 16 may develop a close relationship between the retail vendor 19 and a plurality of consumers 13 by providing personalized, dedicated service to each consumer 13 through his or her client system 12.

Under appropriate privacy guidelines, the consumer 13 may provide information to a secure service provider 16 that utilizes the information to provide dedicated information and services to the consumer. The information and services may be customized in accordance with the customer's preferences received by the service provider 16 in confidence. In one embodiment of the present invention, this information may not be provided to the retail vendor 19. Instead, the retail vendor 19 uses the service provider 16 as a proxy to provide the dedicated services. The consumer 13, who may have a high degree of confidence in the service provider 16, may feel secure that the information provided to the service provider 16 will not be misused.

At the same time, the service provider 16 may provide similar, but separately customized services, for any number of retail vendors 19. Each of those vendors 19 may operate a web site using a web server 18 and each of those vendors may provide different services and products to consumers 13.

In one embodiment of the present invention, the service provider 16 controls the information displayed on the client system 12 and provides Internet and e-mail services as well. Thus, the service provider 16 acts as the Internet service provider for the client system 12. At the same time, the service provider 16 may provide targeted information to the client system 12 on behalf of a particular retail vendor 19.

In some embodiments, the retail vendor 19 may support the acquisition of the client system 12 by the consumer 13. For example, the consumer 13 may be afforded an advantageous price for the client system 12 as a result of the association with the retail vendor 19. In some cases this arrangement may enable consumers, who would otherwise be unwilling to incur the costs associated with obtaining and maintaining a client system 12, to acquire such systems.

As a result of the services provided by the service provider 16, the consumer 13 may implement sales transactions "S" either directly with the retail vendor 19 or through the service provider 16. Ultimately, from the retail vendor's point of view, the consumer 13 receives that information and level of service that the consumer expects and in return the consumer consummates sales transactions with the retail vendor 19.

Figure 2:
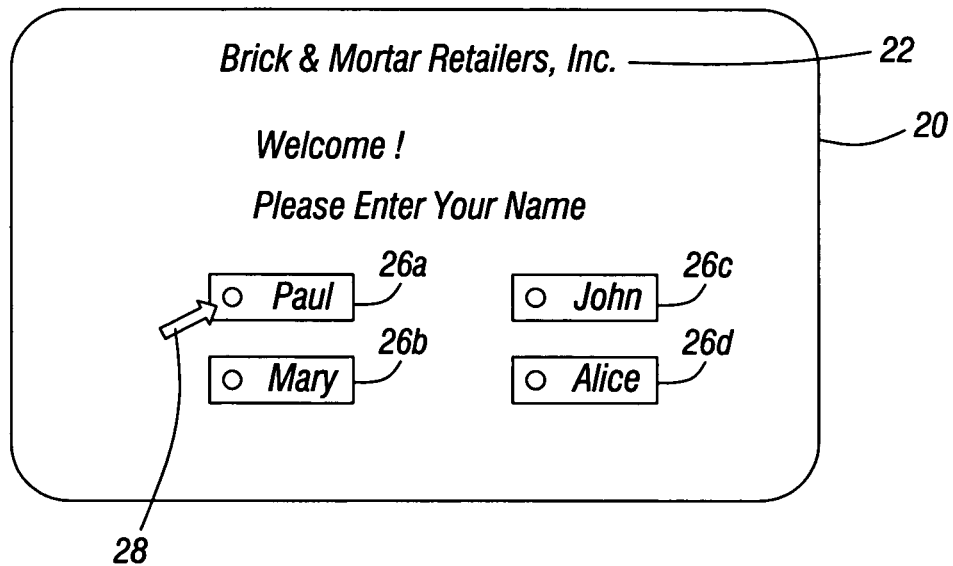
FIG. 2 is a graphical user interface in accordance with one embodiment of the present invention.

Turning next to FIG. 2, an exemplary graphical user interface 20 supported by the client system 12 may be sponsored by a retail vendor 19, such as Brick & Mortar Retailers, Inc. as indicated at 22. In fact, the interface 20 may be provided by the service provider 16 on behalf of the retail vendor 19. The interface 20 may appear upon power up and booting of the client system 12. The interface 20 may pose a request to a particular user who responds by entering his or her name, for example by mouse clicking on an appropriate icon 26. The service provider 16 may already be aware of the family members of a particular family. However, it may be useful, in each case, to know which particular family member is logging onto the system 10. This facilitates the targeting of information not only for a particular family but also to particular members of the family. In the illustrated example, the father, Paul, has clicked on the icon 26a using the mouse cursor 28.

Figure 3:
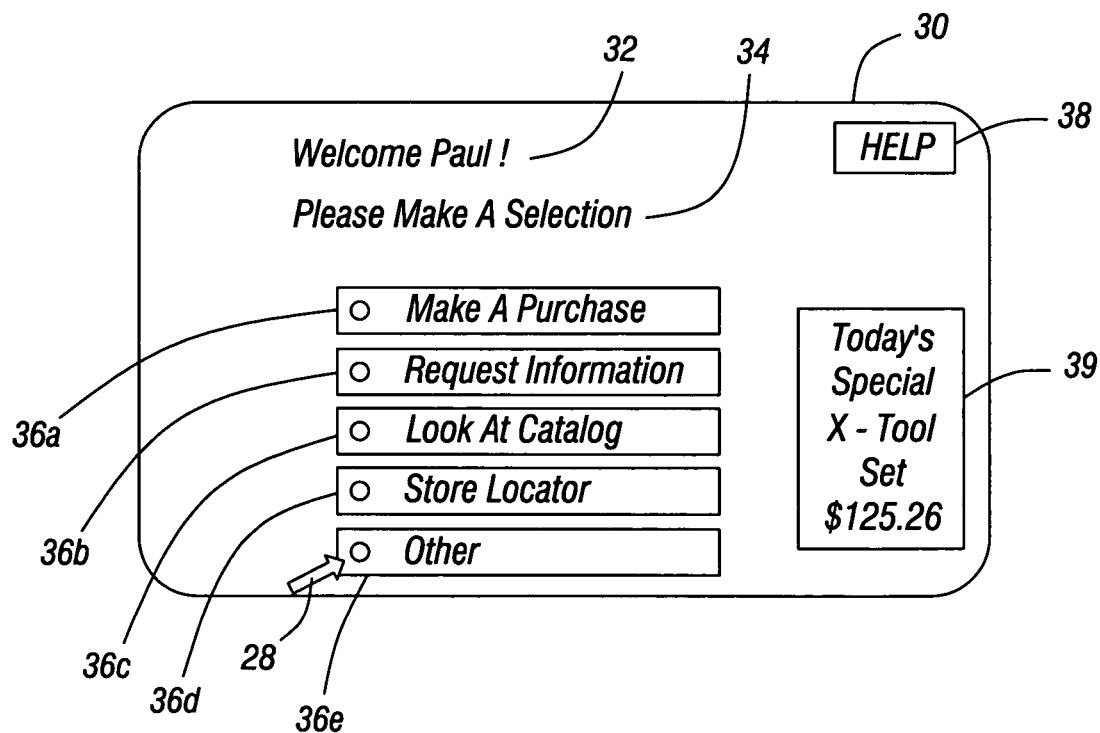
FIG. 3 is a graphical user interface in accordance with another embodiment of the present invention.

The interface 30 is displayed, as shown in FIG. 3, in response to Paul's input. The interface 30 is customized to the preferences of the user named Paul as indicated at 32. The user is then asked to choose a selection as indicated at 34. Potential user selections may be displayed as an icon 36a for making a purchase, an icon 36b for requesting information, icon 36c for viewing a catalog, an icon 36d for using a store locator or an icon 36e for selecting an unlisted choice. Selection of any of the icons 36a, 36b, 36c or 36d may automatically send the consumer to the retail vendor's web site served by a web server 18. The interface 30 may also provide a help button 38.

In addition, targeted advertising such as banner advertising 39 may be provided on the interface 30. Knowing that Paul has logged on and knowing the particular family, the system 10 may provide advertising that is targeted to the active user. Since the system 10 knows that Paul has purchased tools in the past, Paul may be advised by a banner advertisement 39 of a special on tools. The system 10 may know the family circumstances, spending habits, available credit and other information. The available information may be compiled to select advertising that most fits the needs and interests of the active user.

In the embodiment illustrated in FIG. 3, the system 10 is dedicated to the purposes of a retail vendor 19. Thus, the icons 36 primarily offer information pertinent to that retail vendor 19. If the user wishes to obtain information not related to the retail vendor 19, the user must select the other icon 36e to obtain the interface 40 shown in FIG. 4.

From the interface 40, the user can select an icon 44a to access a particular Internet site, an icon 44b to conduct an Internet search, an icon 44c to receive e-mail and an icon 44d to send e-mail. Each of the icons 44 is intended to provide a specific and clear function, making the use of the client system 12 appliance-like in its simplicity.

By reducing the number of options, the service provider 16 can provide better control over the user's experience and may provide simplicity at the same time. Again, advertising 46 may be provided through the interface 40. Knowing the circumstances of the particular user, the advertising may be either customized to a user or selected to be of the greatest interest to the user.

Figure 4:
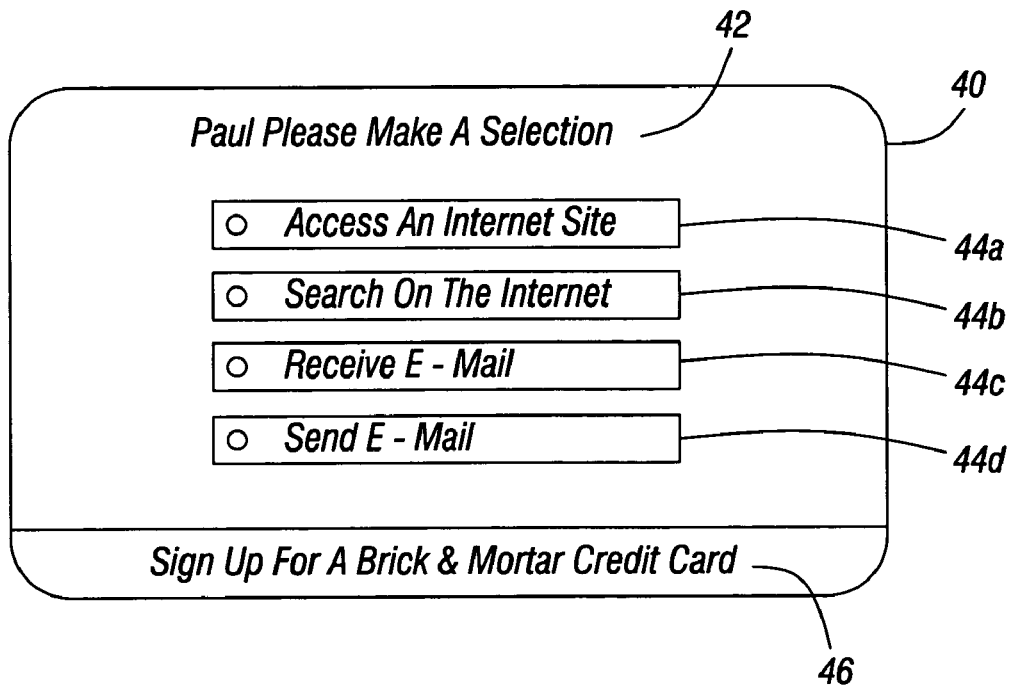
FIG. 4 is a graphical user interface in accordance with still another embodiment of the present invention.

As illustrated in FIGS. 2 through 4, the client system 12 is effectively controlled by the service provider 16 and software on the client system 12. The user is not free to immediately select any Internet site but instead must peruse a series of interfaces 20 and 30, controlled by the system 10, to reach the "other" interface 40. Thus, at least initially, the system 10 controls what information may be viewed and how the user interacts with the client system 12.

Figure 5:
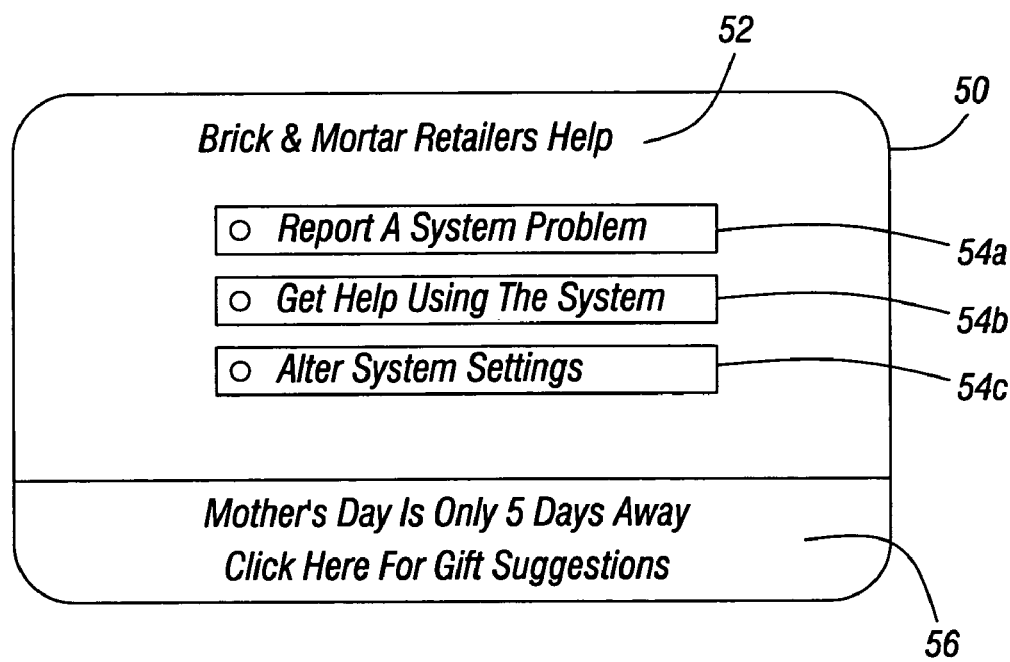
FIG. 5 is a graphical user interface in accordance with another embodiment of the present invention.

Referring next to FIG. 5, selection of the help button 38 (FIG. 3) generates the interface 50 in accordance with one embodiment of the present invention. The user may be asked, through the interface 50, to indicate a selection. The user may report a client system 12 problem by selecting the icon 54a. When the user selects the icon 54a, a report may be provided to the service provider 16 about the problem. A dedicated port may be provided to the client system 12 so that the service provider 16 may diagnose the problem.

Ideally, the service provider 16 may remotely manage the client system 12 to overcome the problem. In some embodiments of the present invention, the service provider 16 is responsible for maintaining the client system 12 in working order. As a result, the service provider 16 may control the user's ability to add additional hardware or software to the client system 12. This ensures that the client system 12 runs as intended and reduces the possibility of unexpected software or hardware problems.

By clicking on the icon 54b, the user may receive guidance on how to use the various graphical user interfaces. In addition, the user may be offered an opportunity to alter some system settings as indicated in icon 54c. However, in one embodiment of the present invention, the user may alter backgrounds, type fonts and the like. However, the user can not alter the content of the interfaces that are controlled by the service provider 16. That is, in order to access information (and in fact to use the system 10), in one embodiment of the present invention, the user must progress through a series of graphical user interfaces dictated by the service provider 16 and its interaction with the client system 12. As in the case of the interfaces 20, 30 and 40, the interface 50 may also include a targeted advertisement 56.

Figure 6:
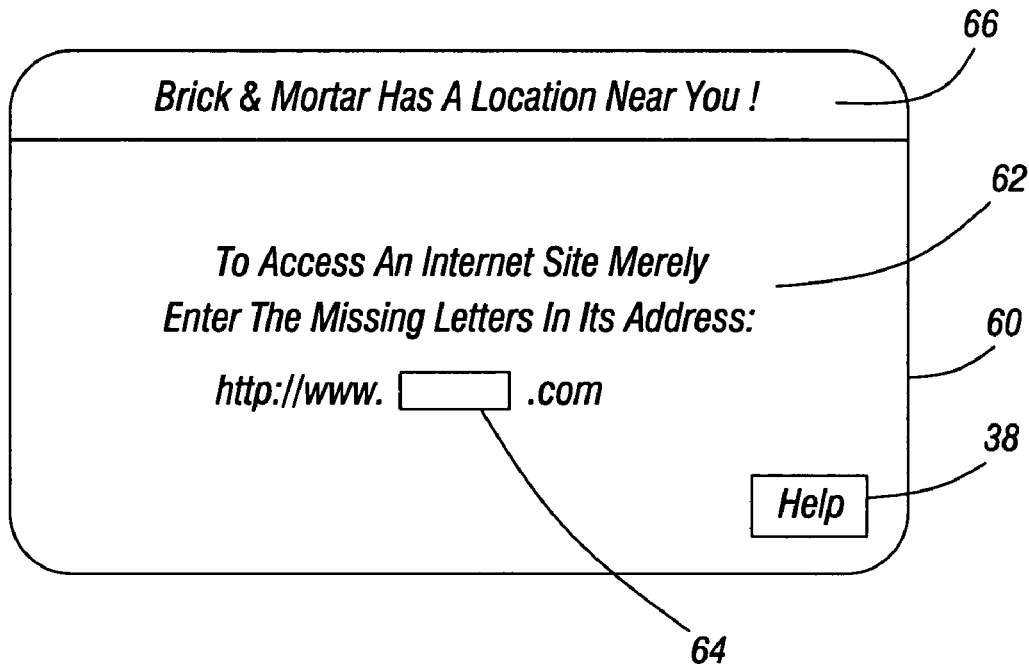
FIG. 6 is a graphical user interface in accordance with another embodiment of the present invention.

When the user selects the access the Internet site icon 44*a* (FIG. 4), the graphical user interface 60, shown in FIG. 6, is provided to facilitate accessing a known Internet site. In this case, directions are provided, as indicated in 62, to facilitate the entry of the web site's address. For example, the user may only be asked to enter a portion of the uniform resource locator in the window 64 to facilitate that entry. A help button 38 may be provided as well. Again, targeted advertising in the form of a banner ad 66 may be included. In this way, the user gets relatively simple on screen directions to implement one specific function.

Figure 7:
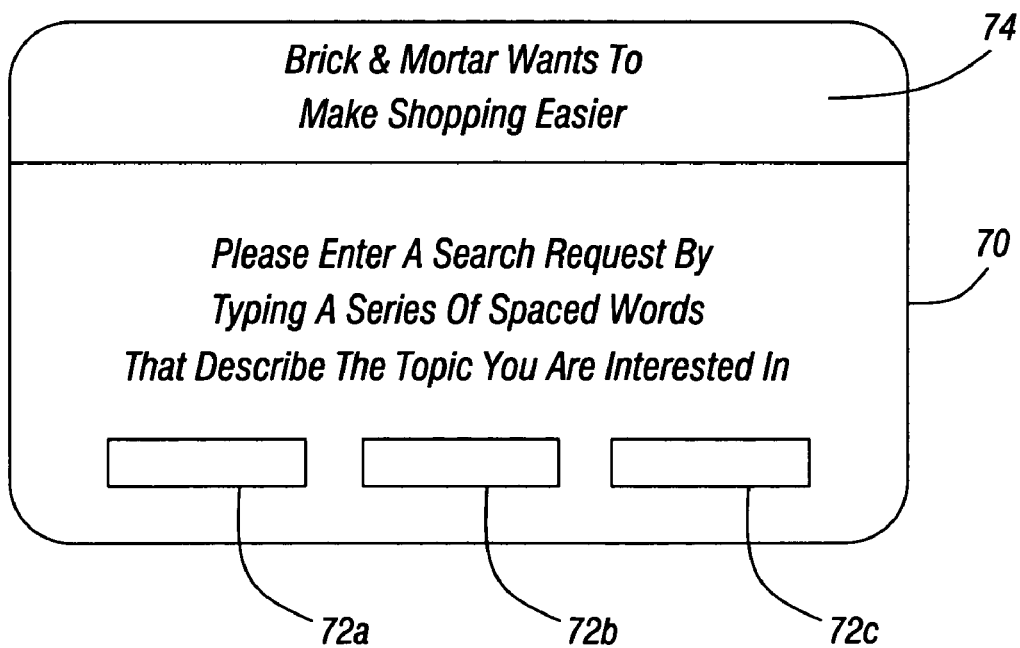
FIG. 7 is a graphical user interface in accordance with another embodiment of the present invention.

Similarly, if the user selects the icon 44*b* to search the Internet (FIG. 4), the graphical user interface 70 appears, as shown in FIG. 7. Again, the user gets relatively straightforward directed instructions to perform a specific function, in this case an Internet search. To simplify the search process in one embodiment, the user may be asked to enter three words (utilized as search terms) in the windows 72*a*, 72*b* and 72*c*. The client system 12 may implement the search using the first entered word. If too many sites are found in the search, the word contained in the second box may be utilized to narrow the search. Similarly, the word in the third box may be added to further narrow the search, if needed. Again, an advertisement targeted to the particular user may be provided, for example as the banner ad 74.

Figure 8:
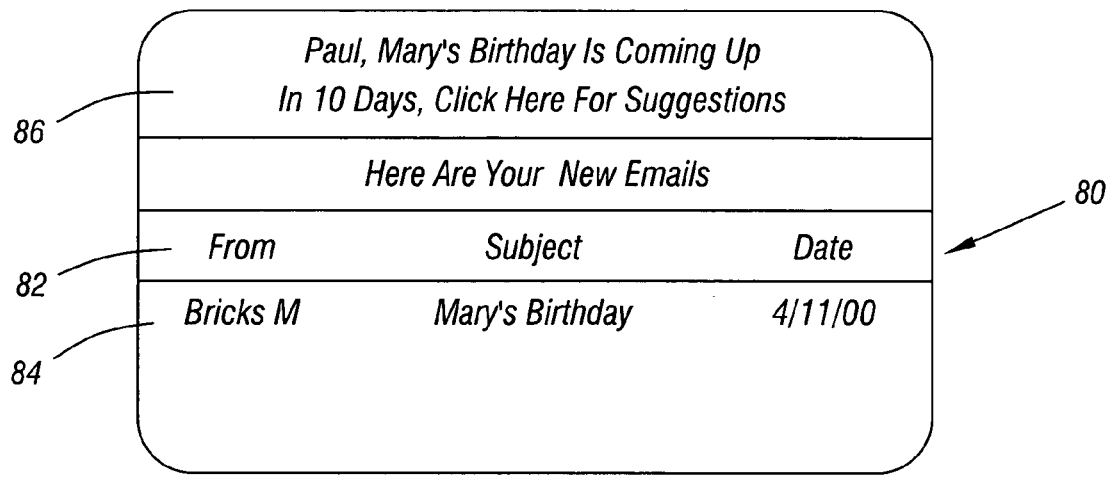
FIG. 8 is a graphical user interface in accordance with another embodiment of the present invention.

If the user selects the receive e-mail icon 44*c* (FIG. 4), the graphical user interface 80 may be created as shown in FIG. 8. In this case, the e-mails that the user has received are presented in a straightforward fashion. An indication of the sender, the subject and the date of the e-mail may be provided as indicated at 84. A simple banner 82 may provide titling for the different types of e-mail information.

A targeted advertisement 86 may be included as well. In this case, the advertisement is targeted because the system knows Mary's birthday. If Paul clicks on the advertisement 86, the system may attempt to suggest birthday presents based on Mary's past purchasing habits, items that Mary has looked at on-line or other information.

Figure 9:
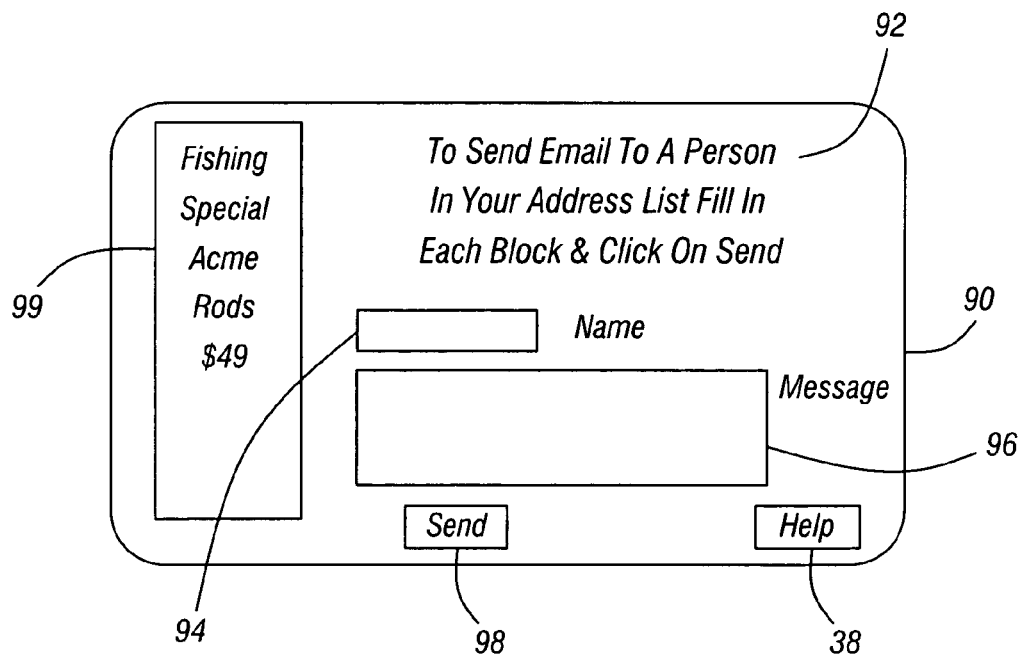
FIG. 9 is a graphical user interface in accordance with another embodiment of the present invention.

Finally, if the user selects the icon 44*d* (FIG. 4) to send an e-mail, the graphical user interface 90 appears as shown in FIG. 9. Again, simple instructions 92 are provided to facilitate the generation of an e-mail message. The user may be asked to simply insert the name of the targeted recipient at window 94 and may be provided with a specific area 96 to type in a message. The user then merely clicks on a send button 98 to transmit the message. Also, targeted advertising 99 may be provided.

Figure 10:
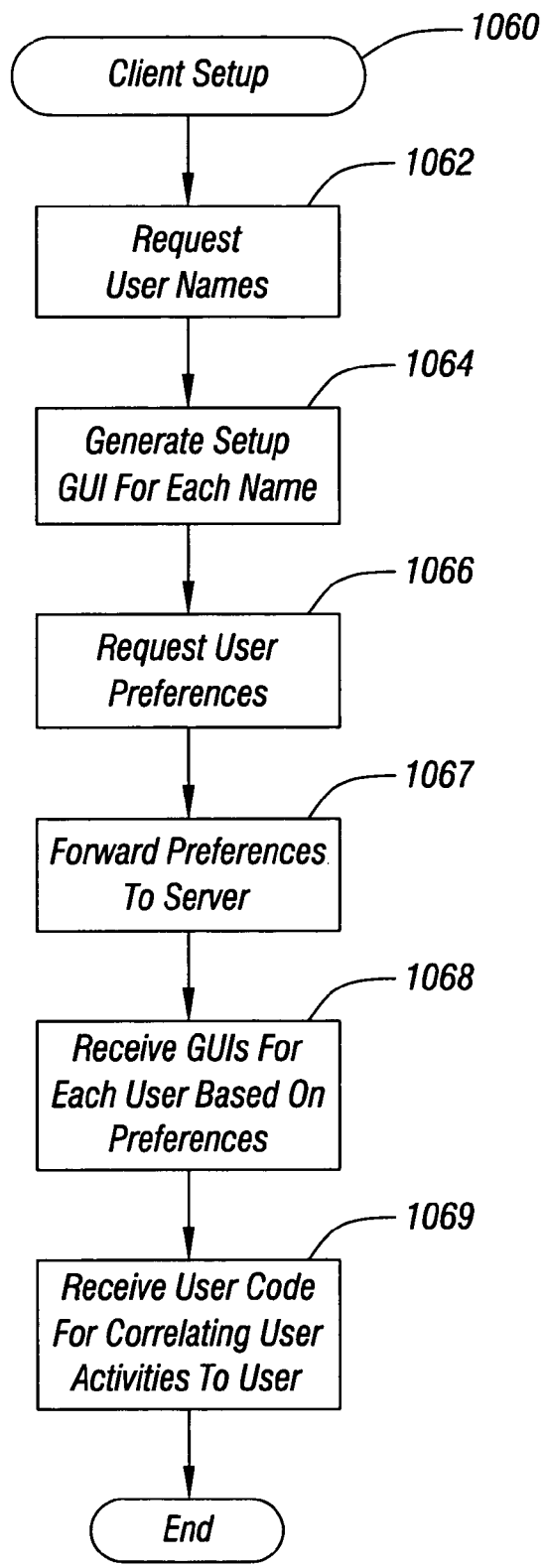
FIG. 10 is a flow chart for software for setting up a client processor-based system in accordance with one embodiment of the present invention.

The software 1060 for setting up the client system 12, shown in FIG. 10, in accordance with one embodiment of the present invention, begins by requesting the names of the intended users of the client system 12 (block 1062). The client system 12 generates a set up graphical user interface for each named user as indicated in block 1064. Thereafter, the client system 12 iterates through each user to request user preferences as indicated in block 1066.

In one embodiment of the present invention, the first user to use the client system 12 may be asked to provide the preferences for the other users. Alternatively, as each user logs on, that user may be asked to enter his or her own preferences in order to gain access to the services provided by the service provider 16.

In one embodiment of the present invention, the client system 12 forwards the preferences to the service provider 16 as indicated in block 1067. This may be done by creating a link to the service provider 16 over the Internet 14. Alternatively, the information may be forwarded over a back channel such as a telephone link. For example, the telephone link may be through a one eight hundred number so that the call does not in any way effect the consumer's telephone bill.

Once the preferences have been forwarded to the service provider 16, the client system 12 may receive graphical user interfaces for each user based on his or her preference indications, as indicated in block 1068. In other embodiments of the present invention, the graphical user interfaces may be resident on the client system 12.

The client system 12 also receives a user code for correlating user activities to each particular user as indicated in block 1069. User activities include the gamut of activities that the user may undertake on the system 12. A log of each item that was selected by the particular user may be compiled. This information, correlated to the user's code and to a client system 12 code, may be provided at appropriate intervals to the service provider 16. This information may be further utilized for a variety of purposes including improving the targeting of advertising materials for each particular user.

Figure 11:
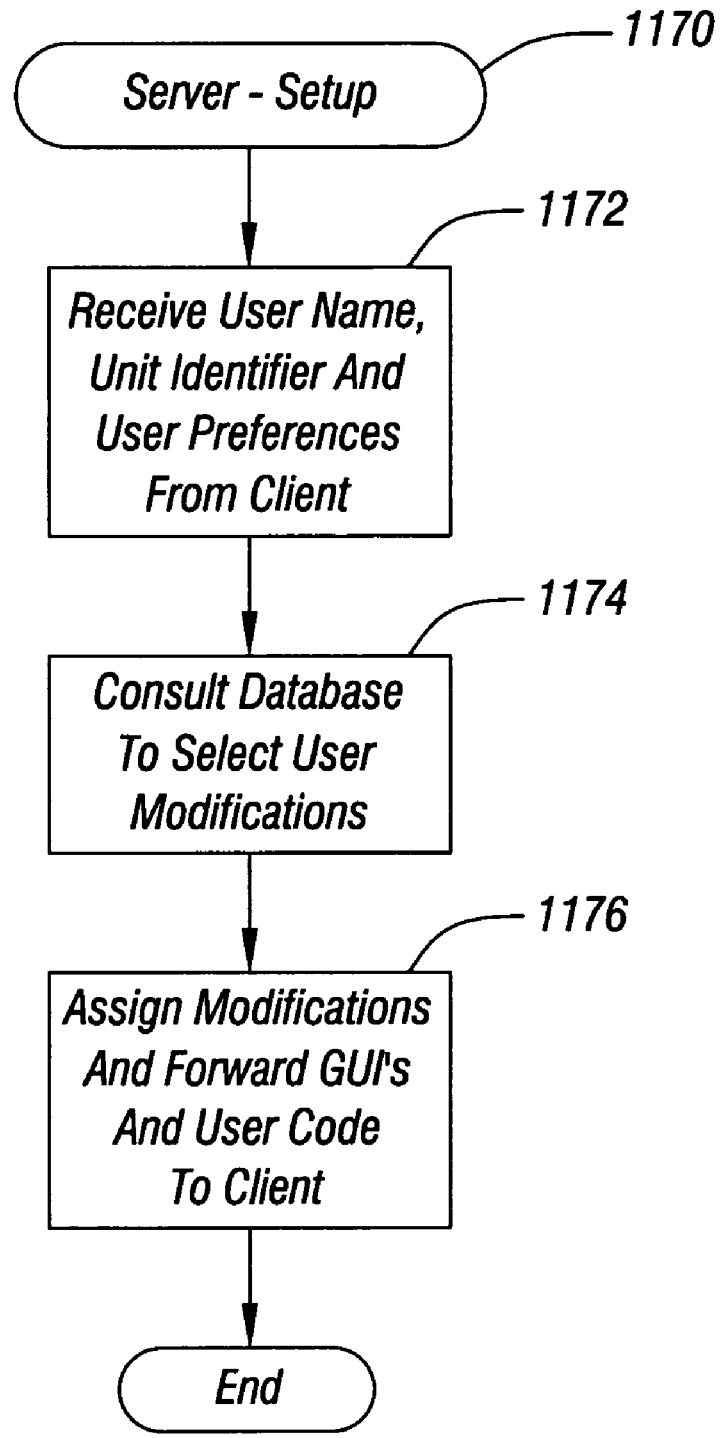
FIG. 11 is a flow chart for software for setting up a server in accordance with one embodiment of the present invention.

On the service provider 16 side, the software 1170, shown in FIG. 11, is responsible for initiating a particular user. The service provider 16 may receive the user's name, the client system 12 identifier and the user's preferences as indicated in block 1172. This information may be stored on a storage 15 (FIG. 1) in accordance with one embodiment of the present invention. A database may also be consulted to select the appropriate user modifications based on the preferences provided by the particular user of the client system 12, as indicated in block 1174.

In one embodiment of the present invention, a preset series of survey style questions are posed. Based on the user's responses, the most appropriate set of modifications may be selected. A table may be stored in the storage 15 that correlates survey question responses to particular characteristics. These characteristics then may be tied to particular advertising or service based content which may be pushed to the client system 12 in one embodiment of the present invention.

Once the appropriate modifications have been determined at the service provider 16, those modifications may be assigned to a particular user. The appropriate graphical user interfaces and a user code may then be forwarded from the service provider 16 to the client system 12 as indicated in block 1176. Those modifications, graphical user interfaces and client identifiers may be stored on an appropriate storage on the client system 12.

Figure 12:
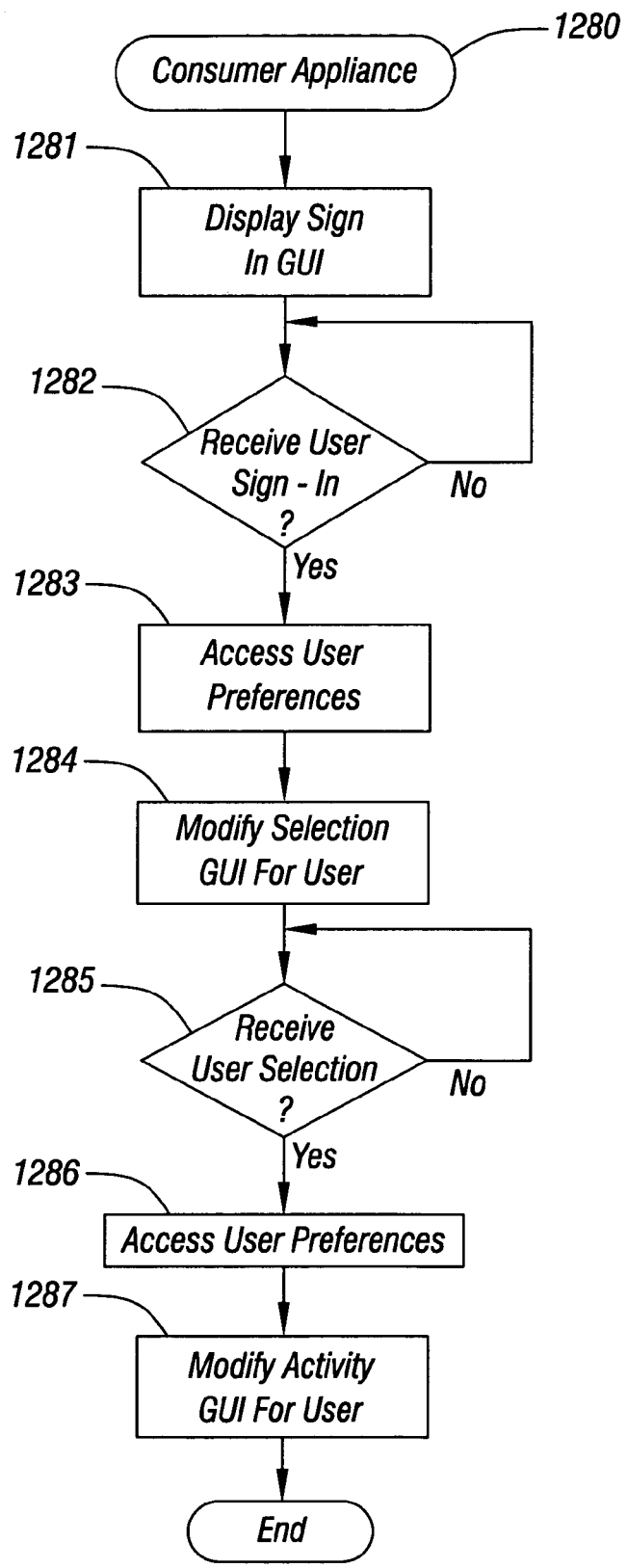
FIG. 12 is a flow chart for software resident on the client for implementing one embodiment of the present invention.

The software 1280 is resident on the client system 12, in accordance with one embodiment of the present invention shown in FIG. 12. The software 1280 may begin, as indicated in block 1281 by displaying the setup graphical user interface 20. The client system 12 receives a user selection of one of the icons 26 to identify the active user, as indicated in diamond 1282. Once the user is identified, the user's preferences may be accessed as indicated in block 1283. The ensuing graphical user interfaces may be modified in accordance with those preferences as indicated in block 1284. These modifications may be developed by the client system 12 or, alternatively, may be downloaded from the service provider 16.

A user selection may be received through the graphical user interface 30, shown in FIG. 3, as indicated by diamond 1285 in FIG. 12. The particular selection may be utilized to access the user preferences (block 1286). In addition, an activity graphical user interface (such as the interfaces shown in FIGS. 2 through 9) for the user may be modified as indicated in block 1287. Each of these activities may be implemented either using software resident on the client system 12 or based on downloads from the service provider 16. In addition, each activity undertaken by a particular user on the system may be recorded and forwarded to the service provider 16 for analysis. As a result of that analysis, the customization for a particular user may be further refined.

Figure 13:
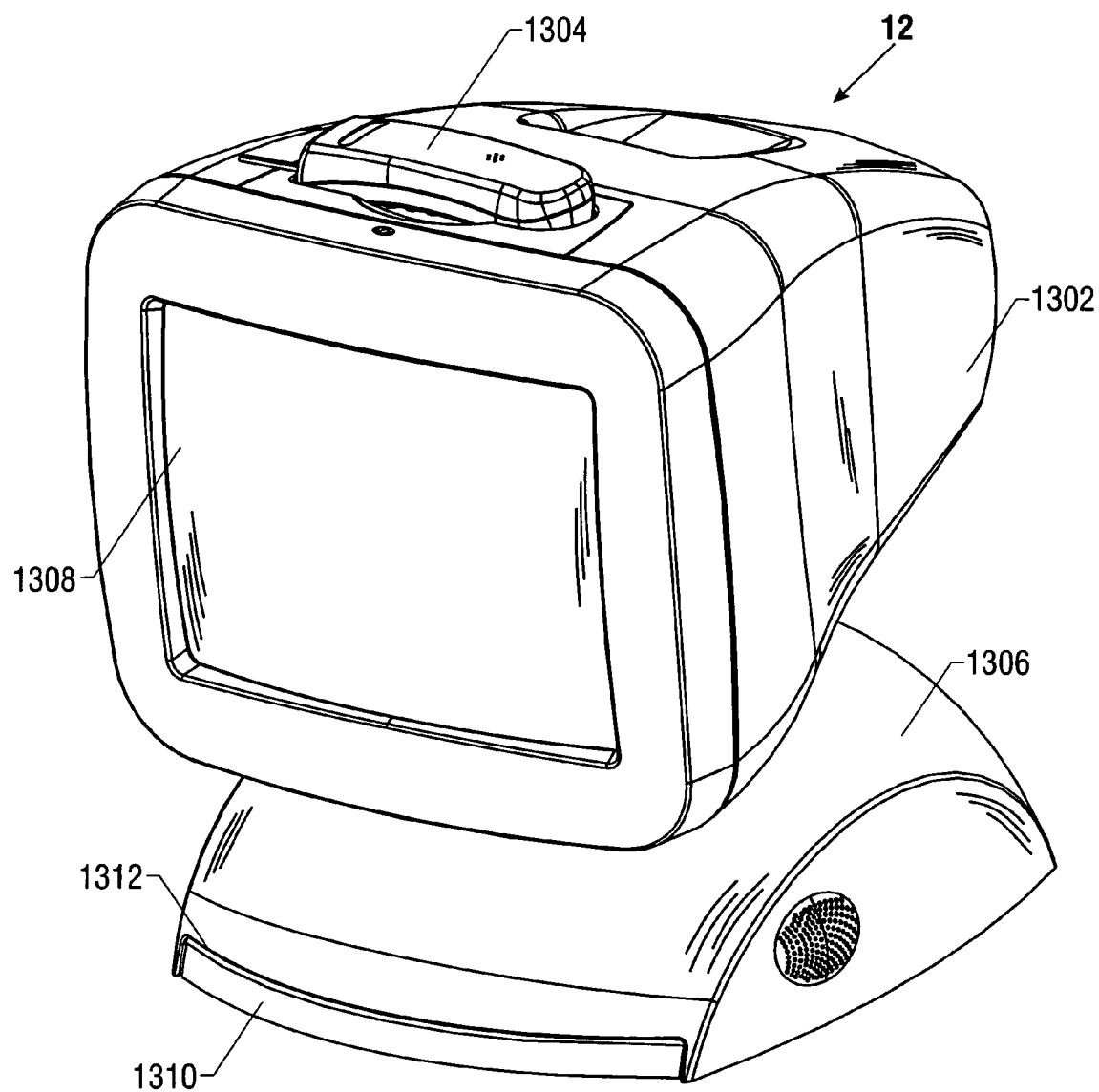
FIG. 13 is a perspective view of an appliance in accordance with one embodiment of the present invention.

An example of the client system 12, shown in FIG. 13, may have a unitary housing including a base 1306 and a monitor 1302. A keyboard 1310 may stored in a slot 1312 in the base 1306. As a result, the system 12 has an appliance-like, compact appearance. A display 1308 may be utilized to display the various graphical user interfaces. In one embodiment of the present invention, a telephone 1304 may be provided which may be operable through the client system 12.

Figure 14:
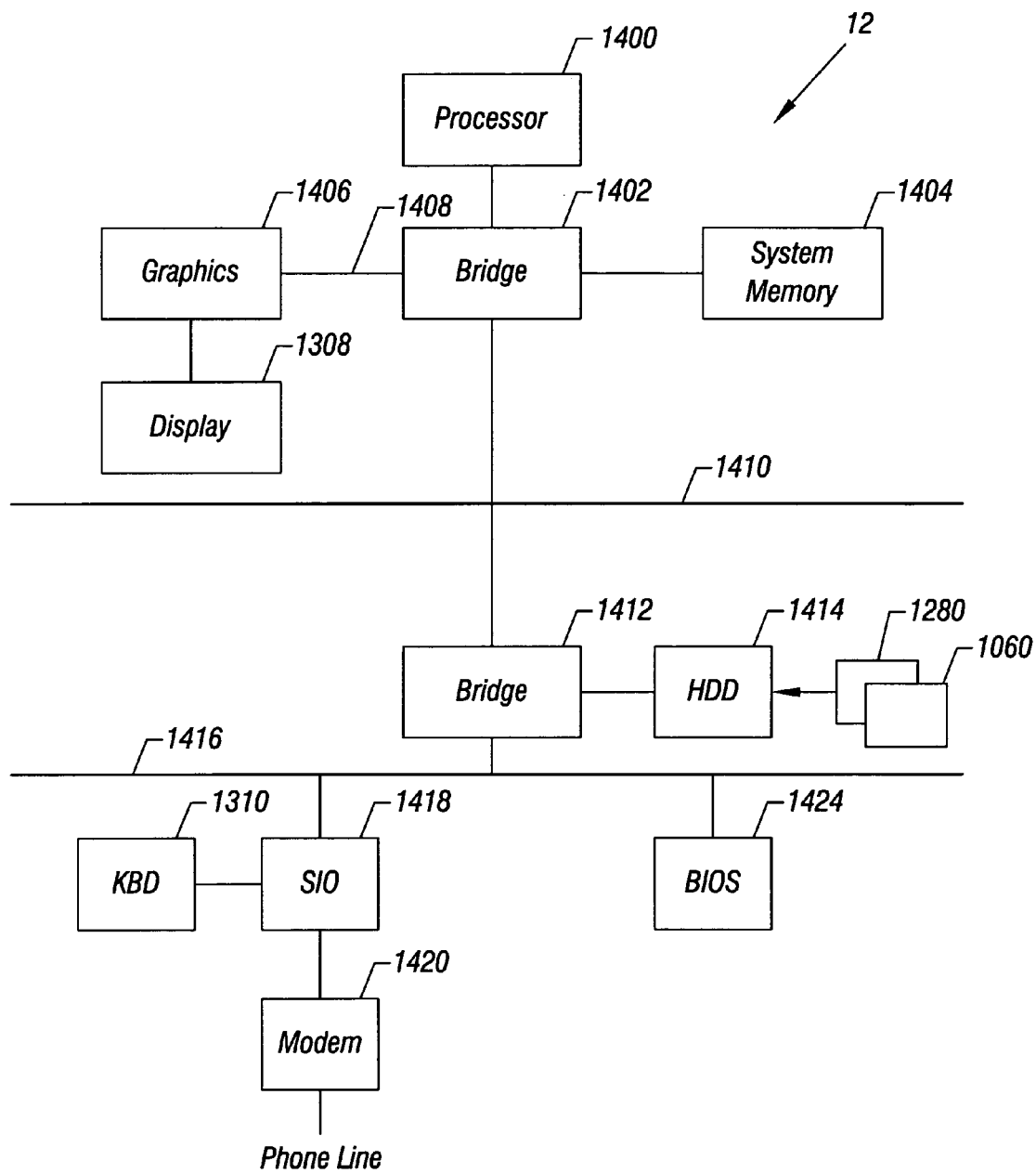
FIG. 14 is block depiction of the embodiment of the present invention shown in FIG. 12.

In one embodiment, the client system 12 may include a processor 1400 coupled to a bridge 1402, as shown in FIG. 14. The bridge 1402 provides an interface between a graphics controller 1406, a bus 1408 and the system memory 1404. The graphics controller 1406 may be coupled to the display 1308. A bus 1410 may be coupled to the bridge 1402. The bus 1410 may include slots that may connect to peripheral devices (not shown). The bus 1410 also is coupled to another bridge 1412. The bridge 1412 is coupled to a hard disk drive 1414 and another bus 1416. The hard disk drive 1414 may store the software 1060 and 1280 in accordance with one embodiment of the present invention.

The bus 1416 may be coupled to a serial input/output (SIO) device 1418 and a basic input/output system (BIOS) memory 1424. The SIO device 1418 may couple the keyboard 1310 and a modem 1420 that provides access to a phone line. The modem 1420 may be utilized in one embodiment of the present invention to gain access to the Internet 14.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   providing a customer identifier together with information about the identified customer's preferences to a service provider;
   receiving a plurality of graphical user interfaces from said service provider, each graphical user interface of said plurality of graphical user interfaces to include content related to the products or services of a particular retail vendor, the content customized, at least in part, based on said information and not to include advertising for another retail vendor; and
   preventing the identified customer from using Internet services through said service provider without the customer first viewing, in sequence, at least three graphical user interfaces from said plurality.

2. The method of claim 1 including tracking the customer's activities while interacting with the graphical user interfaces in said plurality.

3. The method of claim 2 including receiving updated content for said plurality of graphical user interfaces based on said tracking.

4. The method of claim 1 including modifying, on a client system, the content of one graphical user interface in said sequence based on a selection made in the immediately prior graphical user interface in said sequence.

5. The method of claim 1 wherein providing a customer identifier together with the identified customer's preferences includes providing a plurality of customer identifiers to identify each customer that uses a particular client system, and receiving graphical user interfaces from said service provider, a set of said graphical user interfaces customized for each identified customer.

6. A method comprising:
   keeping a record of a user's activities on an activity graphical user interface, the activity graphical user interface received on a processor-based system from a service provider, said activity graphical user interface to include content that is customized for the user on behalf of a particular retail vendor, said activity user interface without content from other, unrelated retail vendors;
   in response to the selection of an indicator on a sign-in graphical user interface, identifying a current user of the processor-based system, said sign-in graphical user interface having different indicators for each known user of said particular processor-based system; and
   customizing content for a selection graphical user interface, said customization based on the current user of the processor-based system, the current user's recorded user input, and the products or services of the particular retail vendor, said selection graphical user interface being a different interface than said activity graphical user interface and said sign-in graphical user interface.

7. The method of claim 6 including providing Internet services to the known users of the processor-based system through said service provider on behalf of said retail vendor.

8. The method of claim 7 including preventing the known users of said processor-based system from accessing said Internet services without first receiving said selection graphical user interface.

9. The method of claim 6 including receiving the preferences of each known user of said processor-based system.

10. The method of claim 9 including providing said preferences and the record of each user's activities to said service provider and not to said particular retail vendor.

11. The method of claim 6 including receiving said selection graphical user interface from said service provider, said selection graphical user interface having a predefined set of selectable options that, if selected, will cause the system to access said particular retail vendor's web site.

12. The method of claim 11 including receiving an activity graphical user interface from said service provider in response to the current user's selection of a selectable option on said selection graphical user interface that is not related to said particular retail vendor.

13. The method of claim 12 wherein receiving an activity graphical user interface includes receiving a help activity graphical user interface in response to selection of a help button on said selection graphical user interface.

14. The method of claim 12 wherein receiving an activity graphical user interface includes receiving an activity graphical user interface for Internet services, said Internet services activity graphical user interface to provide a limited number of options.

15. The method of claim 12 wherein receiving an activity graphical user interface includes receiving an activity graphical user interface for e-mail services.

* * * * *